April 28, 1970     RAISAKU KIYOURA     3,508,868
METHOD OF TREATING EXHAUST GASES CONTAINING SULFUR DIOXIDE
Filed March 4, 1966
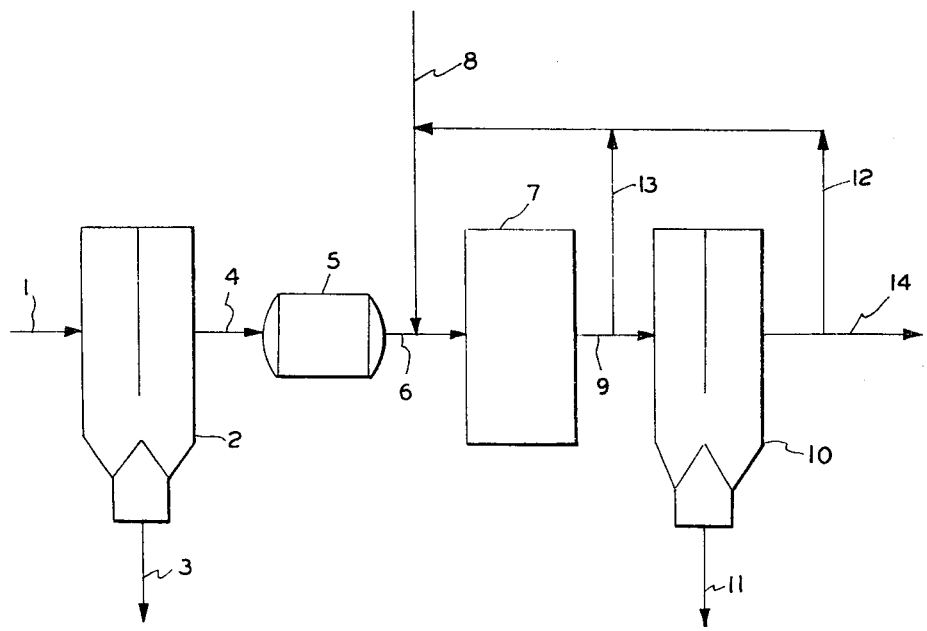
INVENTOR
RAISAKU KIYOURA
BY *Fisher, Christen, Sabol & Caldwell*
ATTORNEYS

United States Patent Office 3,508,868
Patented Apr. 28, 1970

3,508,868
METHOD OF TREATING EXHAUST GASES CONTAINING SULFUR DIOXIDE
Raisaku Kiyoura, Tokyo, Japan, assignor to Mitsui Toatsu Chemicals Incorporated, Tokyo, Japan, a corporation of Japan
Filed Mar. 4, 1966, Ser. No. 531,808
Claims priority, application Japan, July 3, 1965, 40/39,540; Aug. 3, 1965, 40/46,786
Int. Cl. C01c 1/24
U.S. Cl. 23—119        13 Claims This invention relates to a process of eliminating sulfur dioxide contained in exhaust gases.

When exhaust gases containing sulfur dioxide are discharged into the atmosphere, they contaminate the atmosphere. It is therefore very important to remove sulfur dioxide contained in exhaust gases in order to prevent contamination of the atmosphere caused thereby. There have been already known wet and dry processes of removing sulfur dioxide from such exhaust gases containing it, such as flue gases. The wet process is to remove sulfur dioxide by washing exhaust gases with water, aqueous ammonia solution, aqueous manganese oxide suspensions or aqueous chalk suspensions. However, these processes have defects in that they are expensive, the temperature of the washed exhaust gas is reduced, the washed exhaust gas in most cases contains smoggy substances and, therefore, the exhaust gas is not diffused well into the sky. The dry processes include: (1) a process wherein sulfur dioxide in the exhaust gas is oxidized to sulfur trioxide, and removed as sulfuric acid by cooling; (2) a process wherein sulfur dioxide and sulfur trioxide in the exhaust gas are absorbed dry with a solid absorbent; and (3) a process wherein sulfur dioxide and sulfur trioxide in the exhaust gas are adsorbed with any adsorbent. However, such processes have defects in that the equipment used is corroded by the sulfuric acid, the operation is complicated and the absorbent and adsorbent are expensive.

An object of the present invention is to provide an easy and economical method of removing sulfur dioxide contained in exhaust gases by converting it to ammonium sulfate.

According to this invention an exhaust gas containing sulfur dioxide is oxidized to sulfur trioxide which is then reacted with ammonia to form ammonium sulfate which is removed as crystals. Preferably, the exhaust gas is brought into contact with a catalyst containing vanadium pentoxide at a temperautre of 340 to 410° C. and a space velocity of 1,000 to 8,000 to convert the sulfur dioxide contained therein to sulfur trioxide. Ammonia gas is then added to the exhaust gas which now contains the sulfur trioxide and then the exhaust gas is cooled, or the exhaust gas containing sulfur dioxide converted to sulfur trioxide is cooled to a temeprature above its dew point and then ammonia gas is added, so that the sulfur trioxide in the exhaust gas is converted to ammonium sulfate crystals and the ammonium sulfate crystals produced are separated from the remainder of the exhaust gas.

The content of sulfur dioxide in exhaust gases usually is less than 3%. For example, the content of a flue gas from a steam-power plant burning heavy oils is about 0.2% and the content of an exhaust gas from the Claus process of refining petroleum is about 2.5%. In order that such low concentrations of sulfur dioxide contained in exhaust gases can be converted to sulfur trioxide in a gas phase, the apparatus used normally would have to be expanded. In the present invention such a necessity is avoided by using a catalyst containing vanadium pentoxide and selecting the reaction temperature at 340 to 410° C. and the space velocity at 1,000 to 8,000 which is a value considerably larger than that used in the normal contact process for making sulfuric acid by the use of a catalyst containing vanadium pentoxide. At least 70% of the sulfur dioxide contained in the exhaust gas can be thus oxidized to sulfur trioxide in the present process.

The catalyst containing vanadium pentoxide used in the present invention can be any one of those used in the catalytic production of sulfuric acid.

An exhaust gas which has been contacted with the vanadium pentoxide catalyst contains sulfur trioxide and a small amount of unconverted sulfur dioxide. By adding ammonia to said exhaust gas, ammonium sulfate is produced from the sulfur trioxide, ammonia and water normally contained in the exhaust gas. In case the water contained in the exhaust gas in insufficient for the production of ammonium sulfate, additional water vapor can be added to the exhaust gas. The ammonia gas can be added to the high temperature exhaust gas which has been contacted with the vanadium pentoxide catalyst or the high temperature exhaust gas after contact with the vanadium pentoxide catalyst can be cooled to a temperature above its dew point and then the ammonia gas can be added thereto. When ammonia gas is added to the high temperature exhaust gas followed by cooling, the exhaust gas containing the ammonia gas is cooled below the ammonium sulfate crystal formation temperature of about 250° C. and ammonium sulfate crystals are produced. In order to prevent the production of ammonium sulfite due to the small amount of unconverted sulfur dioxide present in the exhaust gas, it is necsesary to maintain the cooling temperature above the temperature at which ammonium sulfite begins to decompose, which is about 60 to 80° C., and preferably above 100° C.

Further, when the high temperature exhaust gas is cooled to a temperature above its dew point and then ammonia is added thereto, the temperature of the exhaust gas should first be below the ammonium sulfate crystal producing temperature but above its dew point when the ammonia gas is added thereto. In such case, even if the gas is not further cooled, ammonium sulfate crystals are produced but it is preferred that the gas temperature stay above the ammonium sulfite decomposition beginning temperature of 60 to 80° C., specifically to a temperature above 100° C.

That is to say, in either case of adding the ammonia gas before or after cooling exhaust gas following contact with the catalyst to a temperature above its dew point, the gas phase reaction temperature of the sulfur trioxide, ammonia gas and water vapor should be within the range from about 60 to 250° C., preferably about 100 to 250° C.

The amount of ammonia gas added should be substantially equal to the amount stoichiometrically required to convert the sulfur trioxide present in the exhaust gas to ammonium sulfate.

Further, it is preferable to add the ammonia gas in diluted form with a proper gas. The exhaust gas from which most of the produced ammonium sulfate has been separated is preferably used as the diluting gas.

In the gas phase reaction of the sulfur trioxide, ammonia and water, it is desirable to recycle the resulting gas containing the ammonium sulfate crystals back into the reaction chamber so that the entrained crystals become nuclei for producing ammonium sulfate and thus accelerate the growth or agglomeration of the produced ammonium sulfate crystals. It is preferable to recycle to the inlet of the reaction chamber a part of the exhaust gas containing ammonium sulfate crystals exiting from the reaction chamber, as it is, as mixed with ammonia gas or as mixed with the exhaust gas from which ammonium sulfate crystals have been separated. Further, if desired, a space for the growth of ammonium sulfate crystals may be provided after the reaction chamber.

The reaction chamber used in the ammonium sulfate producing reaction may be empty, of the cyclone type or the fluid bed type wherein the exhaust gas and ammonia gas are made to react with each other while being passed separately or mixed through a fluid bed of ammonium sulfate.

The produced ammonium sulfate crystals are separated from the exhaust gas by passing it through any gas-solid separator, such as a cyclone, a proper filter or a high voltage electrostatic precipitator (for example of Lodge-Cottrell type).

The present invention shall now be explained with reference to the accompanying drawing diagrammatically showing the process of the present invention. An exhaust gas is introduced into a dust collector 2 through a pipe 1. Ash and/or soot in the gas is removed in the dust collector 2. The ash and/or soot collected in the dust collector 2 is discharged through a discharge pipe 3. For the dust collector, there can be used such gas-solid separator as a cyclone, a high-voltage electrostatic precipitator or a combination of the two. When the exhaust gas contains no solid, the dust collector 2 may be omitted. The exhaust gas from which ash and/or soot has been removed is introduced into a sulfur dioxide converter 5 through a pipe 4 to convert sulfur dioxide in the exhaust gas to sulfur trioxide. The sulfur dioxide converter is charged with such a catalyst containing vanadium pentoxide as, for example, a $V_2O_5$-$K_2SO_4$ catalyst.

In the case of treating a flue gas from a furnace in which hydrocarbons are burnt, unburnt carbon and/or hydrocarbons in the flue gas are removed by passing the flue gas through a filtering zone containing small pieces of ceramic substances in place of the dust collector 2 or on the catalyst layer. The unburnt carbon and/or hydrocarbons deposited on the small pieces of ceramic substances or the catalyst layer may later be burnt off by passing through the filtering zone an oxygen containing gas at a temperature of 500 to 800° C. Oxygen, air or flue gas can be used as the oxygen containing gas.

The temperature of the exhaust gas introduced into the sulfur dioxide converter 5 is brought to 340 to 410° C. and its space velocity is brought to 1,000 to 8,000. The exhaust gas from the sulfur dioxide converter 5 is introduced into a reaction chamber 7 through a pipe 6. In the reaction chamber 7, sulfur trioxide contained in the exhaust gas reacts with ammonia introduced through pipe 8 and the water vapor coexisting in the exhaust gas to produce ammonium sulfate.

It is desirable that the amount of ammonia introduced into the reaction chamber 7 be made substantially equal to the amount stoichiometrically required to convert sulfur trioxide present in the exhaust gas to ammonium sulfate. The ammonia gas can be added to the high temperature exhaust gas from the sulfur dioxide converter 5 and then the gas is cooled to the temperature of 60 to 250° C., preferably 100 to 250° C., or the ammonia is added after the exhaust gas from the sulfur dioxide converter 5 has been cooled to a temperature between a temperature above its dew point and 250° C. The exhaust gas from the reaction chamber 7 is introduced into the crystal separator 10 through a pipe 9. Here ammonium sulfate crystals are separated from the exhaust gas and are taken out through a discharge pipe 11. For the crystal separator there is used such gas-solid separators as a cyclone, a high-voltage electrostatic precipitator or a filter, such as a bag filter. A part of the exhaust gas from which ammonium sulfate crystals have been separated is recycled through a pipe 12 and mixed with the ammonia gas introduced through the pipe 8 and fed to the reaction chamber 7. Furthermore, a part of the exhaust gas from the reaction chamber 7 may be recirculated to the reaction chamber 7 through a pipe 13 to feed crystal nuclei to assist in the production of ammonium sulfate crystals in the reaction chamber 7. The part recirculated through pipe 13 can be mixed with or used in place of that part recycled through pipe 12. Except for these parts recirculated to the reaction chamber 7, the exhaust gas from the crystal separator 10 is discharged into the atmosphere through a pipe 14.

By the method of the present invention, sulfur dioxide in exhaust gases which contaminate the atmosphere can be easily removed as ammonium sulfate crystals which are useful products without further change. Further, the method of the present invention is a dry process wherein it is not necessary to handle any solutions of any kind and it can be worked without any corrosion problems and without any complicated operations.

The method of the present invention is widely useful to eliminate sulfur dioxide contained in exhaust gases such as flue gases from combustion furnaces, exhaust gases from refining metals, exhaust gases from catalytic sulfuric acid plants, and exhaust gases from sulfur recovering apparatus used in refining petroleum.

The following examples illustrate the invention but are not to be construed as limiting. The symbol Nm.$^3$ means cubic meters at standard conditions and percentages are based on volume unless otherwise indicated.

EXAMPLE 1

30 Nm.$^3$/hr. of a flue gas from a heavy oil burning boiler and containing 0.2% $SO_2$, 0.01% $SO_3$ and 2% $O_2$ and at a temperature of 400° C. were passed through a filter of small pieces of a ceramic substance to remove unburnt carbon and were then passed at a space velocity of 3,000 through a sulfur dioxide converter charged with 0.01 m.$^3$ of a $V_2O_5$-$K_2SO_4$ catalyst in two thin layers to oxidize the $SO_2$ into $SO_3$ at a conversion efficiency of 85%. 0.106 Nm.$^3$/hr. of ammonia gas was added to the flue gas from the sulfur dioxide converter. The gas was then cooled with air to 160° C. and was introduced into a reaction chamber 7 to produce ammonium sulfate crystals.

305 g./hr. of the produced ammonium sulfate crystals were separated from the flue gas with a bag filter. In the flue gas from which the ammonium sulfate crystals had been separated, $SO_2$ was present in the amount of 0.03% and there were only traces of $SO_3$ and ammonium sulfate. The purity of the obtained ammonium sulfate was more than 99% (by weight) and 70% (by weight) of it had a particle size greater than 20 mesh.

EXAMPLE 2

The operation was the same as in Example 1 except that about 3.0 Nm.$^3$/hr. of the flue gas coming out of the reaction chamber 7 and containing entrained ammonium sulfate crystals were mixed with 0.106 Nm.$^3$/hr. of ammonia gas and introduced into the reaction chamber. The particle size of 90% (by weight) of the ammonium sulfate crystals separated from the flue gas was greater than 20 mesh.

What is claimed is:

1. Process for removing $SO_2$ from exhaust gas containing less than 3% $SO_2$ and producing ammonium sulfate therefrom comprising the steps of contacting said gas at a temperature of about 340° C. to about 410° C. and a space velocity of about 1,000 to about 8,000 with vanadium pentoxide catalyst to convert $SO_2$ in said gas to $SO_3$, reacting at a temperature in the range of about 60° C. to about 250° C. the thus treated gas with water vapor and gaseous ammonia in amounts approximately stoichiometric to that required to convert the $SO_3$ contained in said gas to ammonium sulfate, removing formed ammonium sulfate crystals from said gas, and recycling a part of the depleted gas after removal of said ammonium sulfate crystals to said reacting step, to dilute the gaseous ammonia fed to said reaction step.

2. Process claimed in claim 1 wherein said water vapor, gaseous ammonia and $SO_3$ are reacted at a temperature in the range of about 100° C. to about 250° C.

3. Process claimed in claim 2 wherein said gas is cooled to a temperature above its dew point prior to mixing same for reaction with gaseous ammonia.

4. Process claimed in claim 2 wherein said gaseous ammonia is mixed with said gas and the resulting mixture is cooled to a temperature within said range for reaction.

5. Process claimed in claim 1 wherein water vapor is added to said gas when necessary to provide a stoichiometric amount thereof for reaction.

6. Process claimed in claim 2 wherein said exhaust gas is produced by a heavy oil burning furnace.

7. Process for removing $SO_2$ from exhaust gas containing less than 3% $SO_2$ and producing ammonium sulfate therefrom comprising the steps of contacting said gas at a temperature of about 340° C. to about 410° C. and a space velocity of about 1,000 to about 8,000 with vanadium pentoxide catalyst to convert $SO_2$ in said gas to $SO_3$, reacting at a temperature in the range of about 60° C. to about 250° C. the thus treated gas with water vapor and gaseous ammonia in amounts approximately stoichiometric to that required to convert the $SO_3$ contained in said gas to ammonium sulfate, recycling a part of the gas containing the formed ammonium sulfate crystals to said reacting step, and removing from the remaining part of said gas said ammonium sulfate crystals.

8. Process claimed in claim 7 wherein said water vapor, gaseous ammonia and $SO_3$ are reacted at a temperature in the range of about 100° C. to about 250° C.

9. Process claimed in claim 8 wherein said gas is cooled to a temperature above its dew point prior to mixing same for reaction with gaseous ammonia.

10. Process claimed in claim 8 wherein said gaseous ammonia is mixed with said gas and the resulting mixture is cooled to a temperature within said range for reaction.

11. Process claimed in claim 7 wherein water vapor is added to said gas when necessary to provide a stoichiometric amount thereof for reaction.

12. Process claimed in claim 8 wherein said exhaust gas is produced by a heavy oil burning furnace.

13. Process for removing $SO_2$ from exhaust gas containing less than 3 volume percent $SO_2$ comprising contacting said exhaust gas at a temperature of about 340° C. to about 410° C. and a space velocity of about 1,000 to 8,000 with vanadium pentoxide catalyst to convert $SO_2$ in said exhaust gas to $SO_3$, reacting at a temperature in the range of about 60° C. to about 250° C. the thus treated exhaust gas with water vapor and gaseous ammonia in amounts approximately stoichiometric to that required to convert the $SO_3$ contained in said treated exhaust gas to ammonium sulfate, and removing formed ammonium sulfate crystals from said gas.

References Cited

UNITED STATES PATENTS

| | | | |
|---|---|---|---|
| 1,740,837 | 12/1929 | Robson | 23—119 |
| 2,912,304 | 11/1959 | Vian-Ortuno et al. | 23—119 |
| 3,172,725 | 3/1965 | Rugh | 23—175 X |
| 3,186,794 | 6/1965 | Davies | 23—175 |
| 3,216,953 | 11/1965 | Krempff | 23—175 X |

OSCAR R. VERTIZ, Primary Examiner

E. C. THOMAS, Assistant Examiner

U.S. Cl. X.R.

23—2, 175, 178